(12) United States Patent
Gerhardt

(10) Patent No.: US 8,251,426 B2
(45) Date of Patent: Aug. 28, 2012

(54) COLLAPSIBLE SEAT CONSTRUCTION FOR A VEHICLE

(75) Inventor: Torsten Gerhardt, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 12/766,863

(22) Filed: Apr. 24, 2010

(65) Prior Publication Data

US 2011/0260489 A1 Oct. 27, 2011

(51) Int. Cl.
*B60N 2/02* (2006.01)
*B60N 2/04* (2006.01)

(52) U.S. Cl. ............... 296/65.01; 296/24.43; 296/65.09; 297/326; 297/329; 297/335

(58) Field of Classification Search ................ 296/24.3, 296/24.4, 24.33, 24.43, 65.01, 65.05, 65.09; 297/325, 326, 329, 331, 332, 334, 335, 336, 297/344.1
See application file for complete search history.

(56) References Cited

U.S. PATENT DOCUMENTS

2010/0141004 A1 * 6/2010 Zeimis et al. ................. 297/336

FOREIGN PATENT DOCUMENTS

| FR | 2698327 A1 | * | 5/1994 |
| GB | 2384464 A | * | 7/2003 |

* cited by examiner

*Primary Examiner* — Dennis Pedder
*Assistant Examiner* — Jason S Daniels
(74) *Attorney, Agent, or Firm* — Shook, Hardy & Bacon LLP

(57) ABSTRACT

A stowable seat 10 for a motor vehicle 1, and in particular for a van, having a moveable bulkhead 9 is disclosed in which a backrest 11 of the seat 10 is stowed vertically above a base 12 of the seat 10 and a support mechanism 20 for the seat 10 is arranged so that no member of the support mechanism 20 is located to the rear of a vertical plane "V" aligned with a rearmost part of the stowed seat 10. This arrangement allows the moveable bulkhead 9 to be moved up to the rearmost edge of the stowed seat 10 thereby maximizing the carrying capacity of the motor vehicle 1 when the seat 10 is stowed. The support mechanisms 20 allow the seat 10 to be moved between its stowed and 'in-use' positions simply by moving the backrest 11.

15 Claims, 13 Drawing Sheets

COLLAPSIBLE SEAT CONSTRUCTION FOR A VEHICLE

TECHNICAL FIELD

The disclosed invention relates to seats for motor vehicles. More particularly, the disclosed invention relates to a stowable seat for use in a van having a moveable bulkhead.

BACKGROUND OF THE INVENTION

Commercial vehicles, such as commercial vans and the like, typically have a bulkhead separating the driver and passenger space from the cargo space. Bulkheads separate the driver and passenger space from the cargo space by extending from one side of the vehicle to the other and from the floor of the vehicle to the ceiling. Bulkheads typically consist of a one-piece sheet metal design, but could also be a multi-piece assembly such that two large stampings spot welded together form a box beam where the upper and lower portions overlap. Plywood and high strength plastics have also been used for bulkheads. Occasionally bulkheads have a portion cut out near the top so as to serve as a window for the driver to see into the cargo space and beyond the rear of the vehicle via use of the rearview mirror.

While effectively defining cargo space, the challenge presented by the known commercial van bulkhead is that it reduces overall flexibility of the vehicle. To have maximum flexibility the commercial van should be a dual-usage vehicle incorporating both a crew cab and a full load-length cargo area satisfies.

Such a dual-usage vehicle can be used to transport workers to a building site in the morning, be used to transport large goods during the working day and then be used to take the workers back home in the evening. Ideally the commercial van should function as a multi-use vehicle that can operate as family transport or as a business van for owner-operators.

In order to meet the demands of these roles the vehicle must be able to be easily converted between a single and a double cab van without requiring parts to be removed from the vehicle while meeting safety requirements such as the need for a full bulkhead in both configurations.

A moveable bulkhead with collapsible seats is set forth in, for example, GB-A-2,384,464. This arrangement provides a full seating position in one condition and a tightly packaged stowed condition. However, the configuration set forth in that reference has the disadvantage that the seats are mounted to the bulkhead. The mounting of the seats to the bulkhead is disadvantageous because it requires a more robust structure to be used for the bulkhead resulting in increased vehicle weight. This arrangement also places unique and expensive requirements on the bulkhead mechanism and latches in order to meet safety standards, in particular, seat belt standards.

Accordingly, as in so many areas of vehicle seating technology there is room for further advancement in the art of collapsible seat systems.

SUMMARY OF THE INVENTION

The disclosed invention provides an alternative arrangement to known collapsible seats for vehicles. Particularly, the disclosed invention provides a stowable seat for a motor vehicle that is floor mounted and occupies the minimum space when stowed.

The arrangement for a collapsible seat of the disclosed invention is particularly although not exclusively for use in a motor vehicle having a moveable bulkhead. The seat comprises a seat back and a seat base having front and rear ends and a pair of support mechanisms connecting the seat back and the seat base to the floor of the motor vehicle. The seat is moveable from an 'in-use' position in which the seat base is arranged substantially horizontally and the backrest extends upwardly from the rear end of the seat base to a stowed position in which the seat base and the backrest are arranged substantially vertically one upon the other with the backrest extending substantially vertically upwards from the rear end of the stowed base. The pair of support mechanisms interlink the backrest and the seat base such that movement between the in-use and stowed positions of the seat is achieved by simply moving the backrest forward or rearward between its 'in-use' and stowed positions. When the seat is in its stowed position no part of the pair of support mechanisms lies to the rear of a vertical plane positioned adjacent to a rear face of the stowed backrest. When the bulkhead is in a forward position, a front face of the moveable bulkhead is aligned with the vertical plane.

Front floor fixings of the pair of support mechanisms may be formed as pivot mechanisms fastened to the floor of the vehicle. The front floor fixings of the pair of support mechanisms may lie forwards of the vertical plane so that the seat can be transformed from its 'in-use' position to its stowed position by motion about its front floor fixings.

The pair of support mechanisms may include at least one latch to hold the seat in its 'in-use' position. Moving the seat from its 'in-use' position to its stowed position comprises releasing the latch before moving the backrest forward to its stowed position.

One support mechanism is located on each side of the seat, each of which preferably comprises a first arm, a second arm, a third arm and a fourth arm. The first arm is fixed at one end to the backrest, releasably attached at an opposite end to the floor of the motor vehicle by a latch and pivotally connected to the seat base so as to support the rear end of the seat base. The second arm is pivotally connected at one end to the backrest and is pivotally connected at an opposite end to the floor of the motor vehicle. The third arm is pivotally connected at one end to the backrest and pivotally connected at an opposite end to the floor of the motor vehicle. The fourth arm is pivotally connected at one end to the seat base and is pivotally connected at an opposite end to the third arm so as to support the front end of the seat base. In combination with the backrest and the floor of the motor vehicle, the second and third arms form a four bar linkage.

The seat base, the fourth arm, the portion of the third arm between the pivotal connection to the fourth arm and the pivotal connection to the first arm and the portion of the first arm in between the pivotal connection of the third arm to the first arm and the pivotal connection to the rear end of the seat base form a second four bar linkage. This linkages control movement of the seat base in relation to the backrest during the transformation of the seat.

The first arm may be used to pivotally connect the second and third arms to the backrest. The first arm may be pivotally connected to the seat base so as to support the rear end of the seat base by a pivot joint. The second arm is pivotally connected to the first arm by the same pivot joint.

The second and third arms may be pivotally connected to a support frame of the backrest and the first arm may be fixed to the support frame.

According to a further aspect of the disclosed invention there is provided a motor vehicle having a moveable bulkhead to vary the load carrying capacity of the motor vehicle wherein the motor vehicle includes at least one motor vehicle seat constructed as set forth above. The motor vehicle may have two or more motor vehicle seats constructed as set forth above arranged as a second row of seats. The second row of seats may comprise one seat having a capacity to support one passenger and one seat having a capacity to support two passengers.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
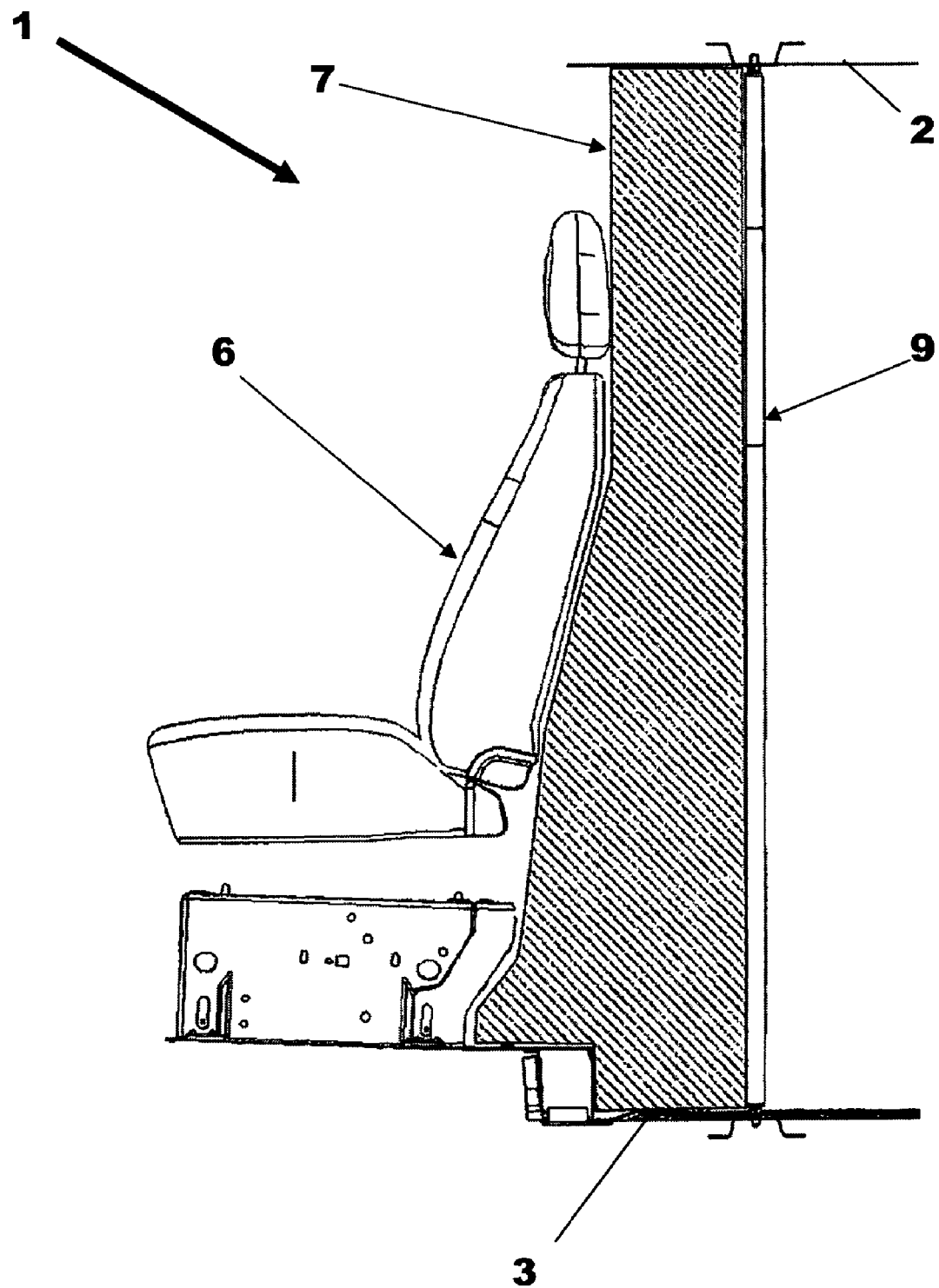
FIG. 1 is a schematic side view of an interior of a motor vehicle showing an available stowage space for a second row seat when a moveable bulkhead is moved to a forward position.

In the following figures, the same reference numerals will be used to refer to the same components. In the following description, various operating parameters and components are described for different constructed embodiments. These specific parameters and components are included as examples and are not meant to be limiting.

Figure 2:
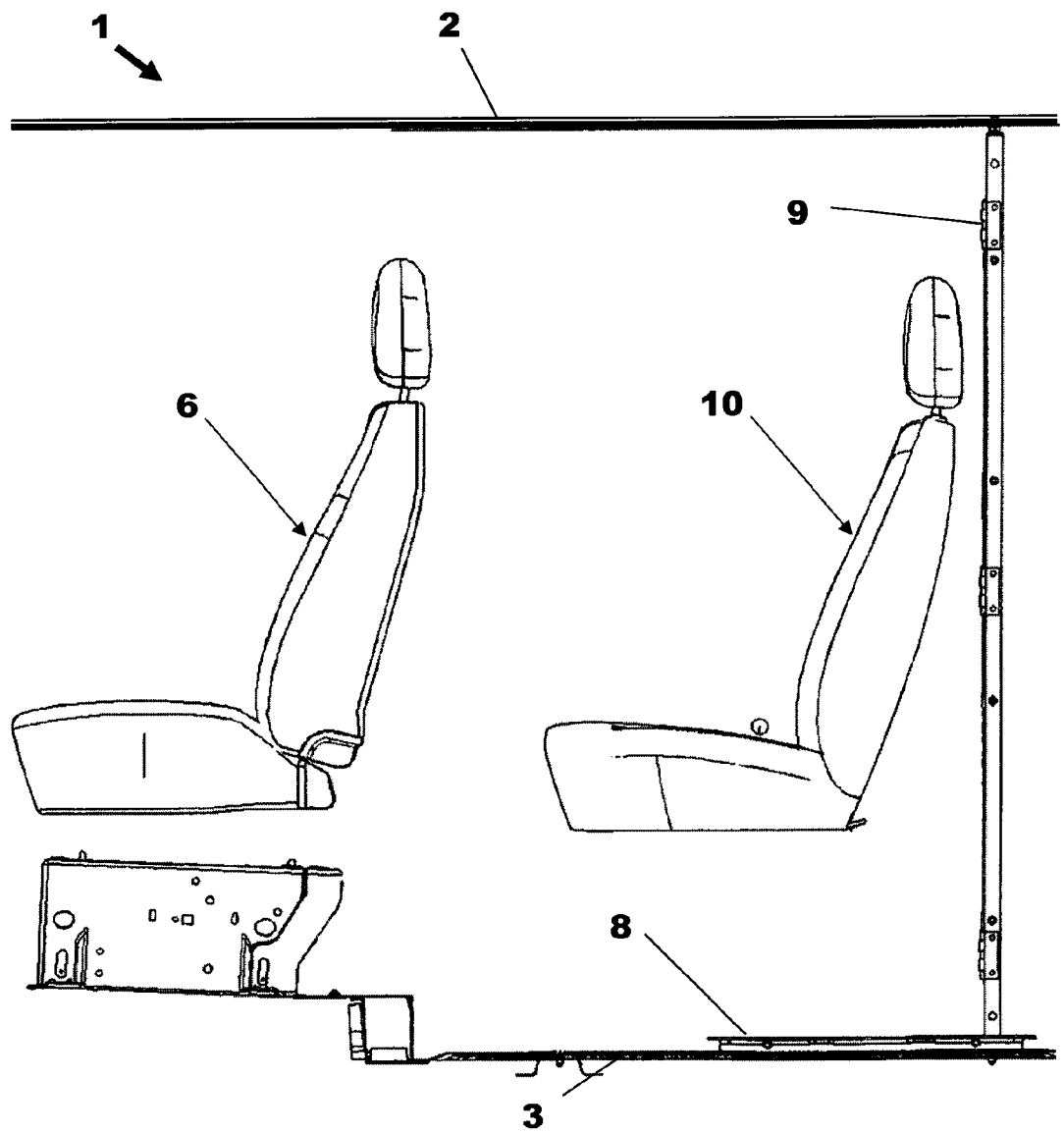
FIG. 2 is a schematic side view of the interior of the motor vehicle showing the available space for the second row seat when a movable bulkhead is moved to a rear position.

With reference to FIGS. 1 and 2, there is shown a motor vehicle in the form of a van 1 having a roof structure 2, a floor structure 3 and a moveable bulkhead 9. A front seat 6 is supported by the floor structure 3 and forms part of a front row of seats.

The moveable bulkhead 9 is moveable between a forward position shown in FIG. 1 and a rearward position as shown in FIG. 2.

When the bulkhead 9 is in its forward position, the van 1 has maximum cargo carrying capacity behind the bulkhead 9 and minimum passenger carrying capacity comprising only the seats such as seat 6 forming the front row of seats. There is a limited volume indicated by the hatched area 7 in which a second row of seats could be stowed. This volume is defined by the forward position of the bulkhead 9 and a rear face of each of the seats 6 in the front row of seats. The forward position of the bulkhead 9 is determined by a number of factors including the position of any side doors, the location of structural members and the need to maximize cargo capacity.

When the bulkhead 9 is in its rearward position the van 1 has minimum cargo carrying capacity to the rear of the bulkhead 9 but maximum passenger carrying capacity enabling a second row of seats including a seat 10 to be provided.

The seat 10 must be a stowable seat capable of being stowed within the hatched area 7 when the bulkhead 9 is moved to its forward position but must provide suitable accommodation for at least one passenger when in its 'in-use' position.

Figure 3A:
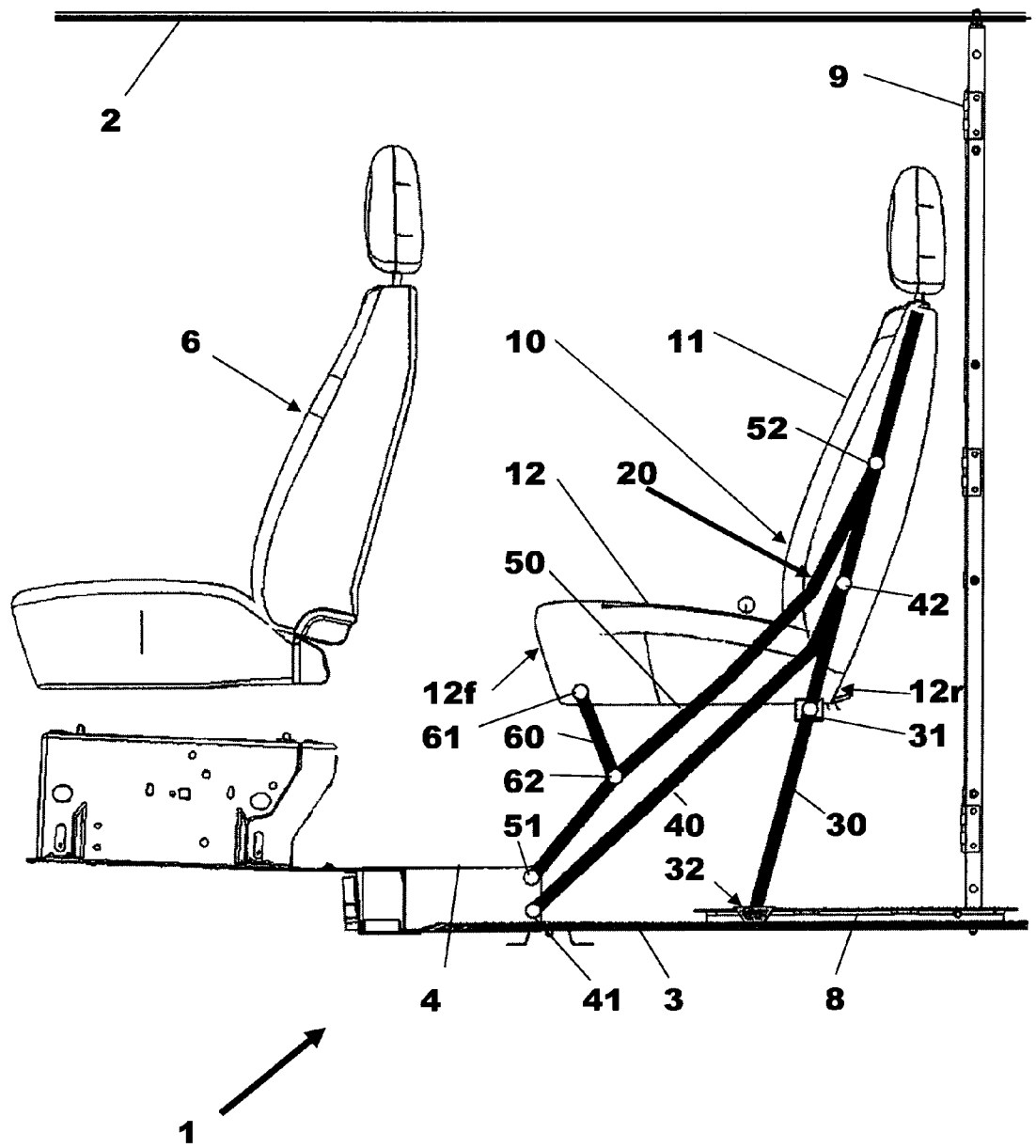
FIG. 3a is a schematic side view of the interior of the motor vehicle showing a second row seat constructed in accordance with the invention showing the seat in an 'in-use' position.

With reference to FIG. 3a there is shown the seat 10 according to the disclosed invention in an 'in-use' position. The seat 10 comprises a seat back 11 and a seat base 12 having a front end 12f and a rear end 12r and a pair of support mechanisms 20, of which only one is shown, connecting the seat back 11 and the seat base 12 to the floor 3 of the motor vehicle 1.

There is one support mechanism 20 located on each side of the seat 10, each of the support mechanisms 20 comprised of first, second, third and fourth arms 30, 40, 50 and 60 respectively which are interlinked so as to interconnect the backrest 11 and the seat base 12 and connect the seat 10 to the floor 3 of the motor vehicle 1.

The first arm 30 is fixed at one end to the backrest 11 and is releasably attached at an opposite end to the floor 3 of the motor vehicle 1 by a latch 32. In this case the latch 32 is arranged to cooperate with a latch plate 8 so as to secure the seat 10 in the 'in-use' position. However, it will be appreciated that the latch plate could alternatively be formed as part of the floor 3 of the motor vehicle 1.

The first arm 30 is also pivotally connected at an intermediate position by a pivot joint 31 to the seat base 12 near to the rear end 12r of the seat base 12 so as to support the rear end 12r of the seat base 12.

The second arm 40 is pivotally connected at one end by a pivot joint 42 to the backrest 11 and is pivotally connected by a pivot joint 41 at an opposite end to the floor 3 of the motor vehicle 1 or more precisely to a bracket 4 forming part of the floor structure 3. The connection of the second arm 40 to the backrest 11 is in this case achieved by means of the first arm 30 to which it is pivotally connected by the pivot joint 42.

The third arm 50 is pivotally connected at one end by a pivot joint 52 to the backrest 11 and is pivotally connected by a pivot joint 51 at an opposite end to the bracket 4 forming part of the floor structure 3 of the motor vehicle. The connection of the third arm 50 to the backrest 11 is in this case achieved by means of the first arm 30 to which it is pivotally connected by the pivot joint 52.

The fourth arm 60 is pivotally connected by a pivot joint 61 at one end to the seat base 12 near to the front end 12f of the seat base 12 and is pivotally connected by a pivot joint 62 at an opposite end to the third arm 50 so as to support and control the movement of the front end 12f of the seat base 12.

The second and third arms 40 and 50 respectively form, in combination with the backrest 11 and the floor 3 of the motor vehicle 1, a first four bar linkage which supports and controls the movement of the seat 10 during transit between the 'in-use' and stowed positions.

The seat base 12, the fourth arm 60, the portion of the third arm 50 in between the pivots 62 and 52 and the portion of the first arm 30 in between pivots 52 and 31 form a second four bar linkage which controls the movement of the base 12 in relation to the backrest 11 during the transformation of the seat 10. The second four bar linkage is actuated or controlled by the difference in angular movement between the first arm 30 and third arm 50 of the first four bar linkage.

When the seat 10 is in the 'in-use' position, the seat base 12 is arranged substantially horizontally and the backrest 11 extends upwardly from the rear end 12r of the seat base 12 as shown in FIG. 3a.

Figure 3B:
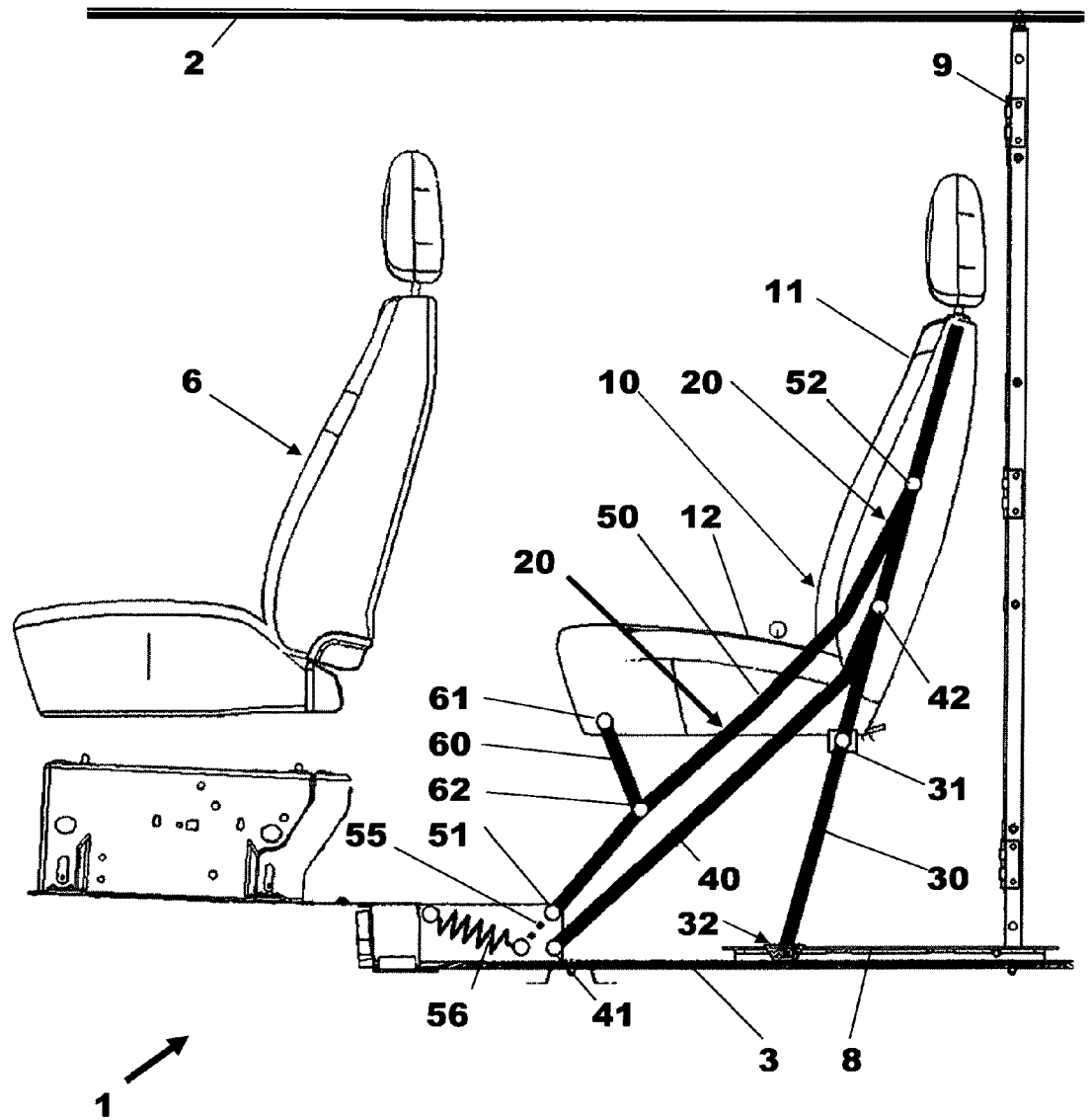
FIG. 3b is a schematic side view similar to that shown in FIG. 3a but showing a modification to the second row seat.

FIG. 3b shows a second embodiment of a motor vehicle seat 10 which differs from that shown in FIG. 3a only in that an assist spring 56 is attached to an extension 55 of the third arm 50 to bias the seat 10 towards the stowed position. That is to say, when the latch 32 is released, the spring 56 will assist with the stowing of the seat 10.

Figure 4:
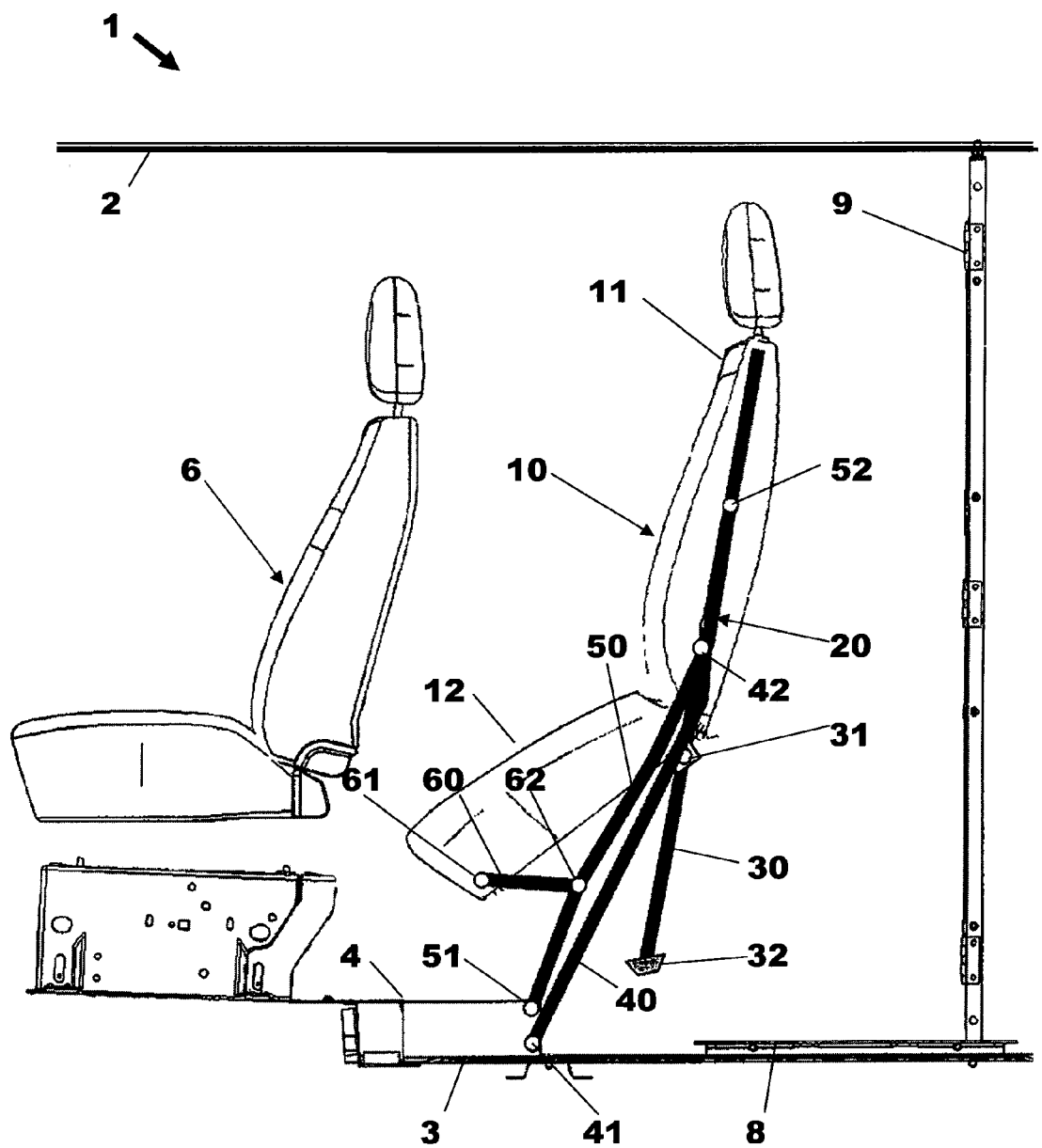
FIG. 4 is a schematic side view of the interior of the motor vehicle showing the second row seat in a partially stowed position.

In FIG. 4 the seat 10 is shown in a partially stowed position in which the latch 32 has been released and the backrest 11 has been moved in a forward direction. This movement has not only caused the backrest 11 to move forwards but also move upwards and rotate forwards due to the constraint imposed by the second and third arms 40 and 50. The forward motion of the backrest 11 also causes the seat base 12 to rotate downwardly due to the reduction of the angle between arms 30 and 50 causing the base pivot 31 to move forwardly with respect to the third arm 50 forcing the base pivot 61 to move forwards correspondingly which results in a counter-clockwise rotation of the fourth arm 60 due to the connection of the fourth arm 60 to the third arm 50.

Figure 5:
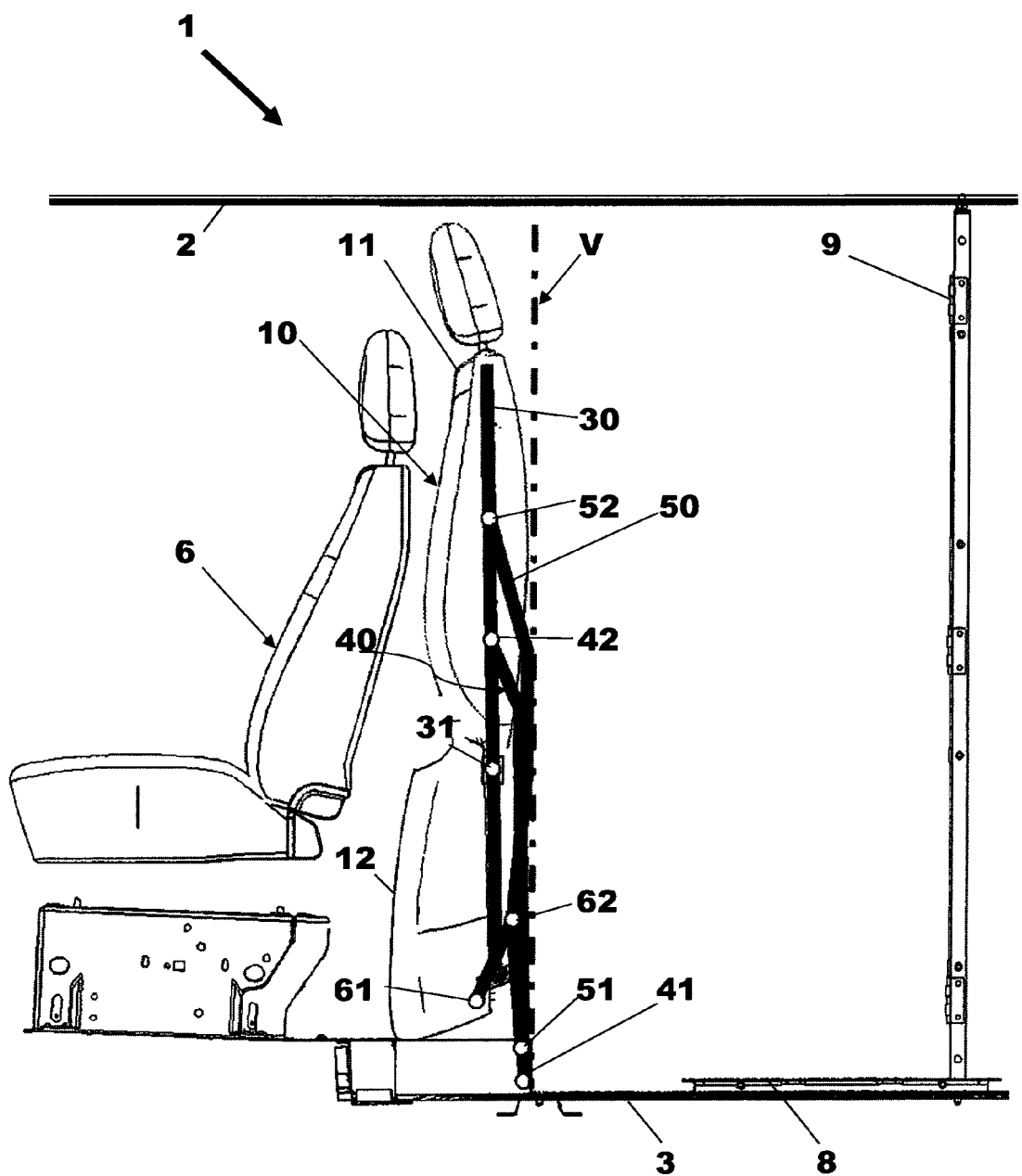
FIG. 5 is a schematic side view of the interior of the motor vehicle showing the second row seat in a stowed position with the bulkhead in a rear position.

FIG. 5 shows the seat 10 in the stowed position prior to the bulkhead 9 being moved forward. In the stowed position the seat base 12 and the backrest 11 are arranged substantially vertically one upon the other with the backrest 11 extending substantially vertically upwards from the rear end 12r of the stowed base 12. This arrangement is the optimum package for the stowed seat 10 in that it maximizes the available cargo area behind the stowed seat 10.

When the seat 10 is in its stowed position, no part of the pair of support mechanisms 20 lies to the rear of a vertical plane "V" positioned adjacent to a rear face of the stowed backrest 11. The vertical plane "V" may be positioned so as to touch the rear face of the backrest 11 or may be positioned a few millimeters to the rear of the rear face of the backrest 11.

One significant advantage of this invention is that the joints 51 and 41 are always positioned forwards of the plane "V" so that they are always forwards of any bulkhead position, that is to say, never in the cargo area.

The seat 10 therefore does not need to be fully de-latched, lifted and manually moved forwards out of the cargo area as would be the case if front seat fixings, used instead of the pivots 51 and 41, were formed conventionally as latches fixed to latch plates positioned rearwards of the plane "V".

It will be appreciated that these latch plates could also be positioned forwards of the plane "V" similar to joints 51 and 41, thereby not adding the requirement to fully de-latch, lift and manually move the seat 10, but if this were the case then any latches attached to the seat arms 40 and 50 would not need to provide a de-latch function but instead would need to be able to rotate in the latch plates, thereby effectively turning the latched connection into a hinged connection, which is the reason why joints 51 and 41 are formed as hinges in this invention.

Figure 6:
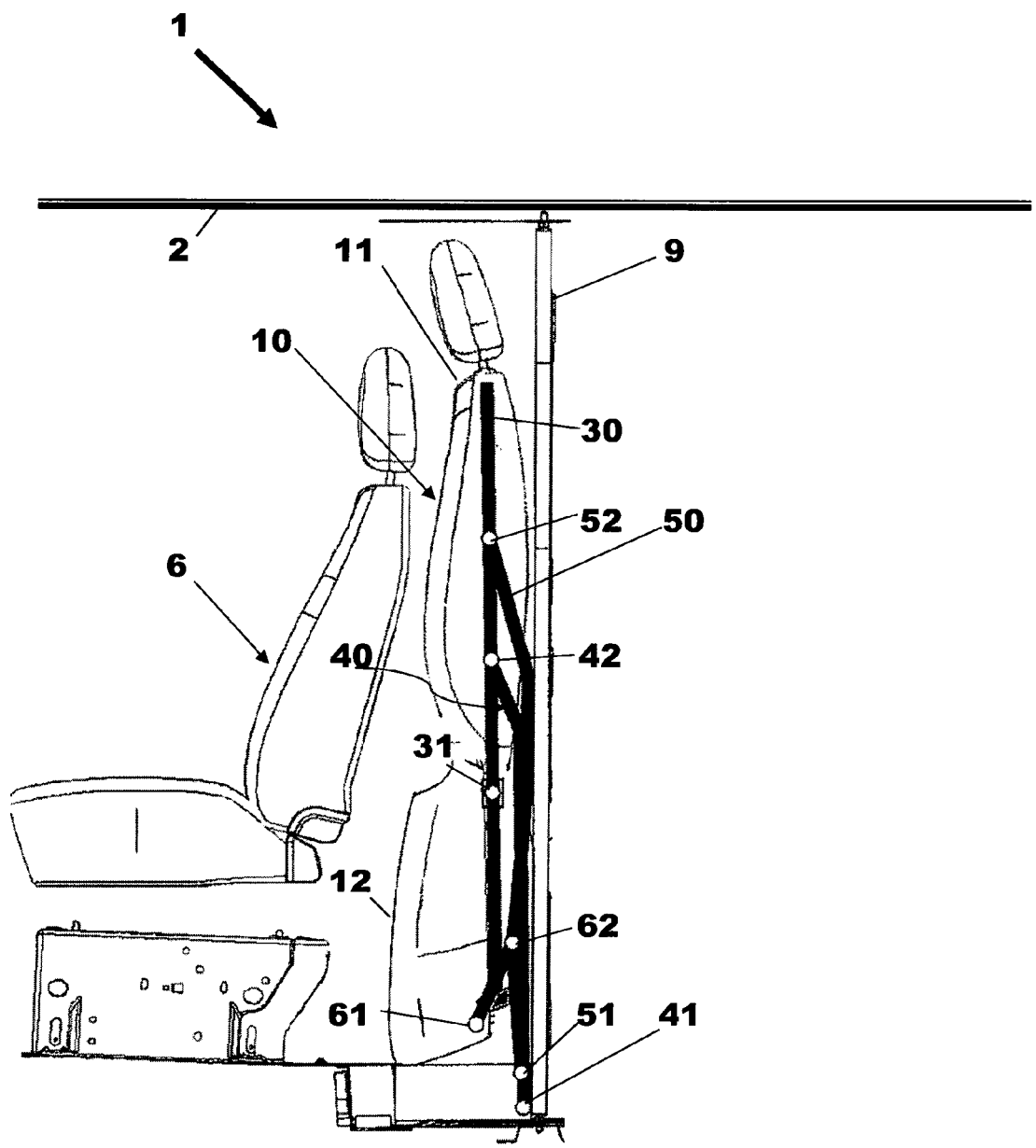
FIG. 6 is a schematic side view similar to FIG. 5 showing the second row seat in a stowed position with the bulkhead in a forward position.

FIG. 6 is identical to FIG. 5 with the exception that the bulkhead 9 is shown in its forward position. When the bulkhead 9 is in its forward position, a front face of the moveable bulkhead 9 is aligned with the vertical plane "V" and so it may be desirable for the vertical plane "V" to be slightly to the rear of the rear face of the backrest 11 so that rattling of the backrest 11 against the bulkhead 9 is avoided.

Operation of the seat 10 is as follows.

From the 'in-use' position shown in FIGS. 3a and 3b, the first step is to release the latch 32 holding the seat 10 in the 'in-use' position. This is affected by operating a handle or lever (not shown) attached to an upper portion of the backrest 11 and connected to the latch 32 by a cable (not shown). After the latch 32 has been released the backrest 11 is merely pulled forward using the handle to the stowed position. Because the support mechanisms 20 interlink the backrest 11 and the seat base 12 no separate operation of the seat base 12 is required. After the seat 10 has been stowed the bulkhead 9 can be moved to its forward position as shown in FIG. 6.

To return the seat 10 from the stowed position to the 'in-use' position, the bulkhead 9 is first moved to its rear position and then the backrest 11 is merely pushed or pulled rearwardly until the latch 32 is re-engaged.

One significant advantage of the invention is that movement of the seat 10 between the in-use and stowed positions is affected by simply moving the backrest 11 forward or rearward between its 'in-use' and stowed positions.

It will be appreciated that the seat 10 can be designed to have the capacity to accommodate a single passenger or could be designed to have the capacity to accommodate more than one passenger. It will also be appreciated that the motor vehicle may have two or more seats 10 arranged as a second row of seats.

Figure 7:
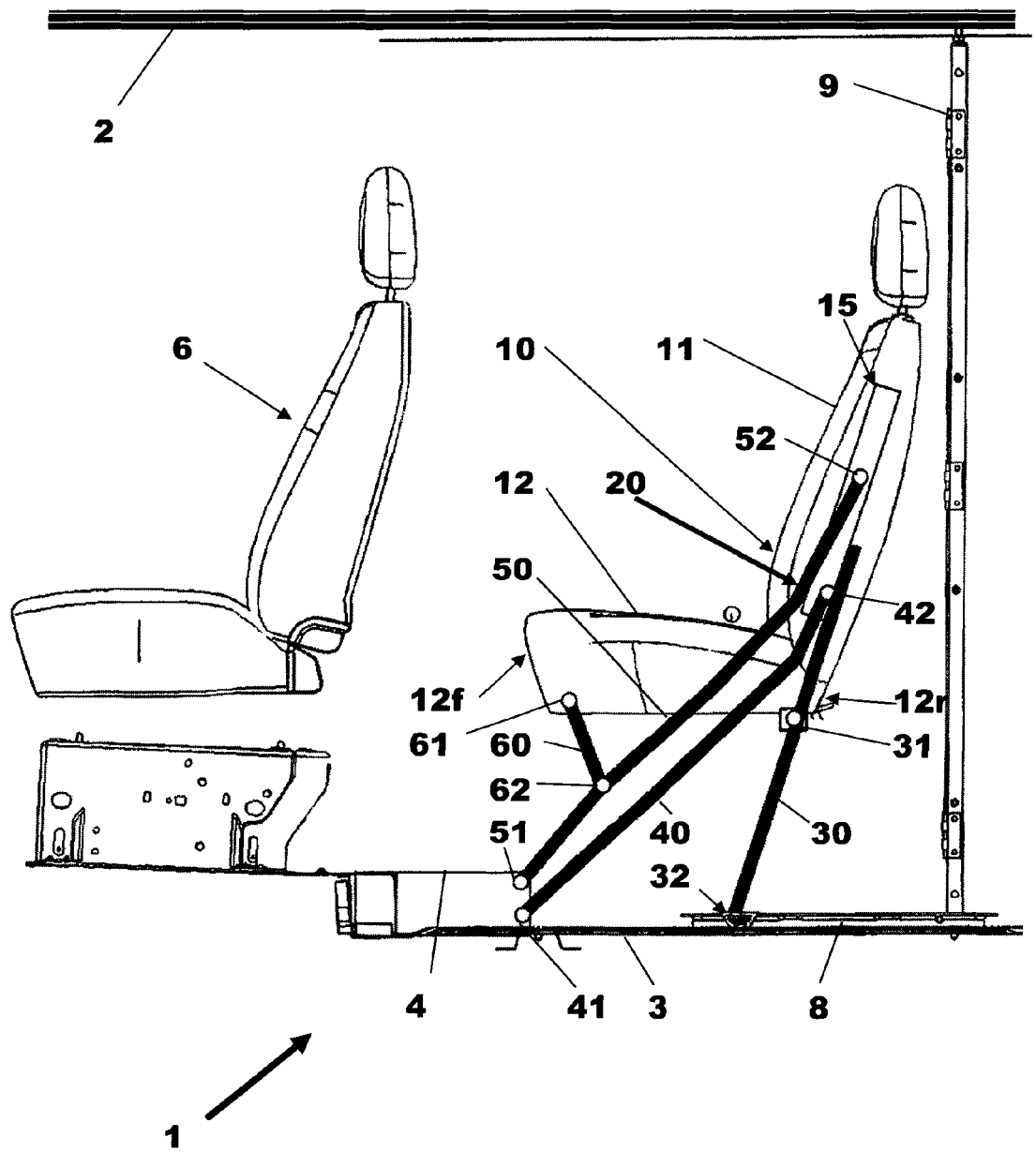
FIG. 7 is a schematic side view similar to FIG. 3a but showing a second embodiment of a second row seat according to the invention.

Referring to FIG. 7 there is shown a motor vehicle seat 10 which in most respects is identical to the seat previously described and which functions in an identical manner. The only significant difference between the seat 10 shown in FIG. 7 and the seat shown in FIG. 3a is that in the embodiment shown in FIG. 7 the second and third arms 40 and 50 are pivotally connected to a support frame 15 of the backrest 11 and the first arm 30 is fixed to the support frame 15 whereas, in the embodiment shown in FIG. 3a, the second and third arms 40 and 50 respectively are pivotally connected to the first arm 30 and the first arm 30 forms part of a support frame for the backrest 11.

Figure 8:
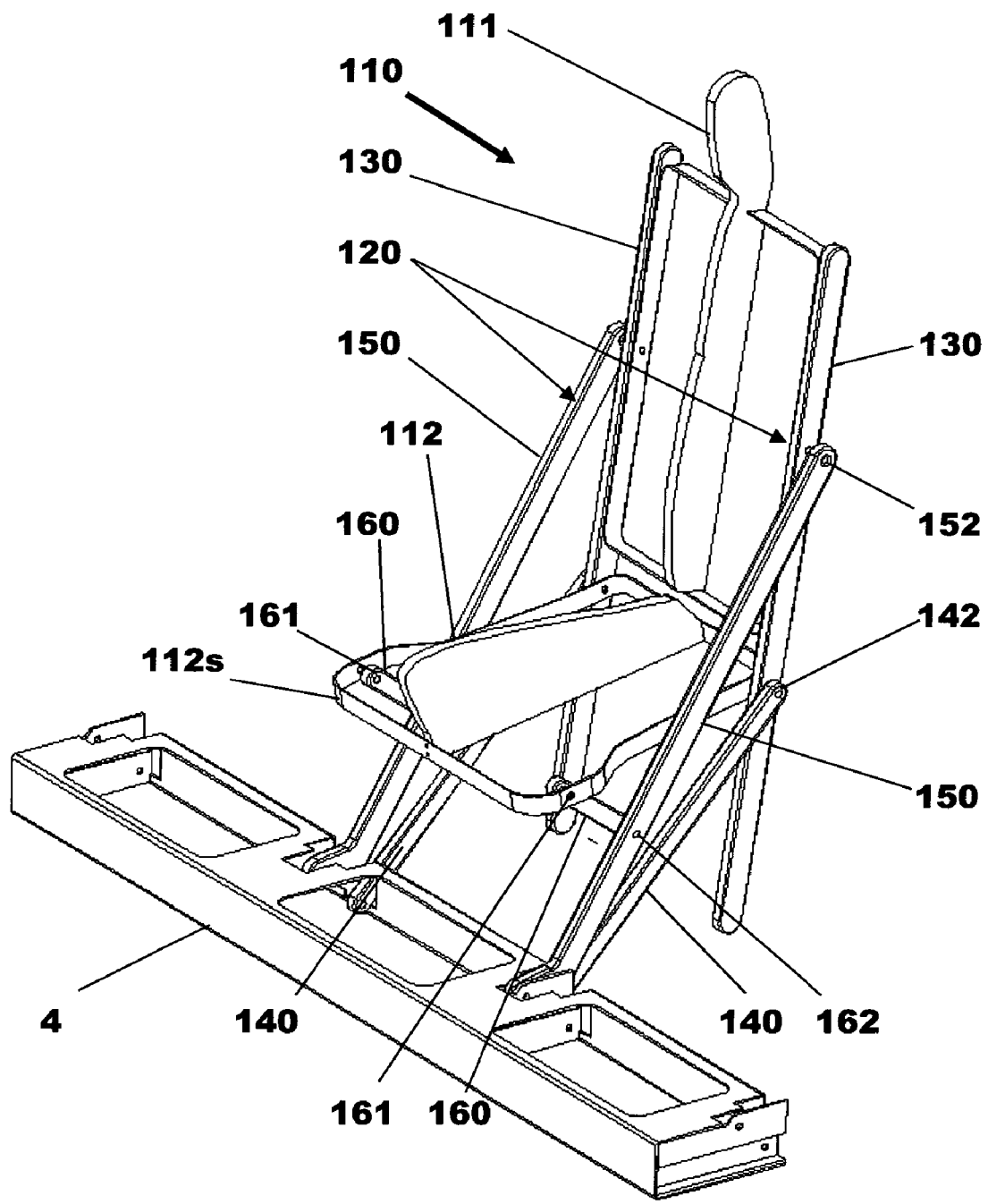
FIG. 8 is a pictorial view of a second row seat according to a preferred embodiment.
Figure 9:
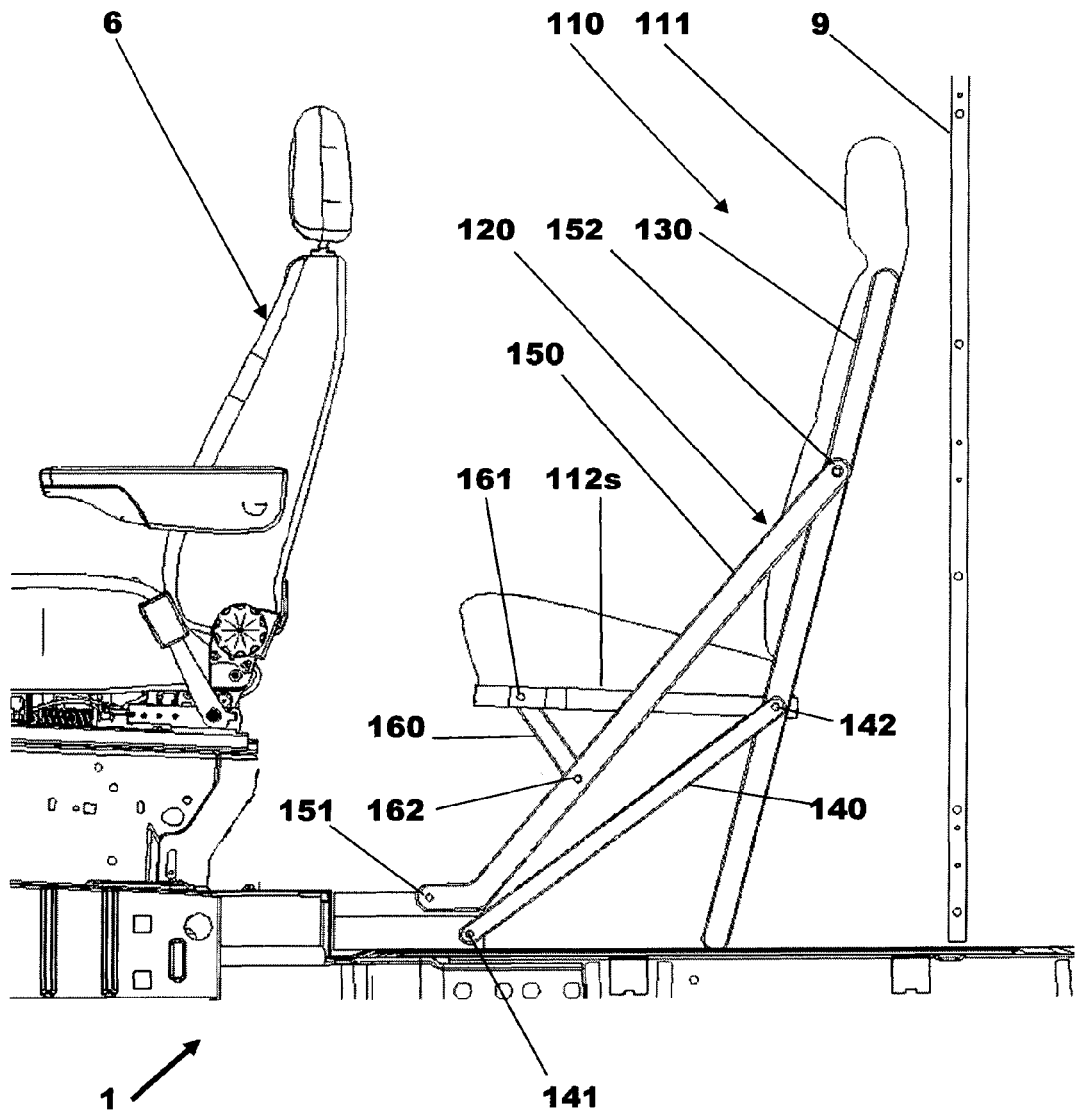
FIG. 9 is a schematic side view of the interior of the motor vehicle showing the second row seat shown in FIG. 8 in an 'in-use' position.

With reference to FIGS. 8 to 12 there is shown a preferred embodiment of a motor vehicle seat 110 according to the invention capable of meeting these needs. FIG. 9 shows the seat 110 in an 'in-use' position. The embodiment of the illustrated motor vehicle seat 110 is only suggested as variations may be made without deviating from the spirit or scope of the disclosed invention. Particularly, and with reference to FIG. 8, the motor vehicle seat 110 may be one or more single seats, may be a two-passenger double seat, may be a multi-passenger bench seat, or may be any combination thereof.

The motor vehicle 1 is as described above having a roof structure, a floor structure and a moveable bulkhead 9.

The seat 110 comprises a seat back 111 and a seat base 112 having a front end and a rear end and a pair of support mechanisms 120 connecting the seat back 111 and the seat base 112 to the floor of the motor vehicle 1.

There is one support mechanism 120 located on each side of the seat 110, each of the support mechanisms 120 comprises of first, second, third and fourth arms 130, 140, 150 and 160 respectively which are interlinked so as to interconnect the backrest 111 and the seat base 112 and connect the seat 110 to the floor of the motor vehicle 1.

The first arm 130 is fixed at one end to the backrest 111 and is releasably attached at an opposite end to the floor of the motor vehicle 1 by a latch (not shown). The first arm 130 is also pivotally connected at an intermediate position by a pivot joint 142 to the seat base 112 near to the rear end of the seat base 112 so as to support the rear end of the seat base 112.

The second arm 140 is pivotally connected at one end by the pivot joint 142 to the backrest 111 and is pivotally connected by a pivot joint 141 at an opposite end to the floor of the motor vehicle 1 or more precisely to a support structure 4 forming part of the floor structure by means of a bracket 190. The connection of the second arm 140 to the backrest 111 is in this case affected by means of the first arm 130 to which it is pivotally connected by the pivot joint 142. The connection of the first arm 130 to the seat base 112 and the connection of the second arm 140 to the first arm 130 are therefore coincident both being made by means of the same pivot joint 142.

The third arm 150 is pivotally connected at one end by a pivot joint 152 to the backrest 111 and is pivotally connected by a pivot joint 151 at an opposite end to the support structure 4 which forms part of the floor structure of the motor vehicle. The connection of the third arm 150 to the backrest 111 is in this case affected by means of the first arm 130 to which it is pivotally connected by the pivot joint 152.

The fourth arm 160 is pivotally connected by a pivot joint 161 at one end to a frame 112s of the seat base 112 near to the front end of the seat base 112 and is pivotally connected by a pivot joint 162 at an opposite end to the third arm 150 so as to support and control the movement of the front end of the seat base 112.

The second and third arms 140 and 150 form in combination with the backrest 111 and the floor of the motor vehicle 1 a four bar linkage which supports and controls the movement of the seat 110 during transit between the 'in-use' and stowed positions.

The frame of the seat base 112s, the fourth arm 160, the portion of the third arm 140 in between the pivotal connection 162 to the fourth arm 160 and the pivotal connection 152 to the first arm 130 and the portion of the first arm 130 in between the pivotal connection 152 of the third arm 150 to the first arm 130 and the pivotal connection 142 to the rear end of the seat base 112 form a second four bar linkage which controls the movement of the seat base 112 in relation to the backrest 111 during the transformation of the seat. The second four bar linkage is actuated or controlled by the difference in angular movement between the first arm 130 and third arm 150 of the first four bar linkage.

When the seat 110 is in the 'in-use' position, the seat base 112 is arranged substantially horizontally and the backrest 111 extends upwardly from the rear end 12r of the seat base 12 as shown in FIG. 8.

Figure 10:
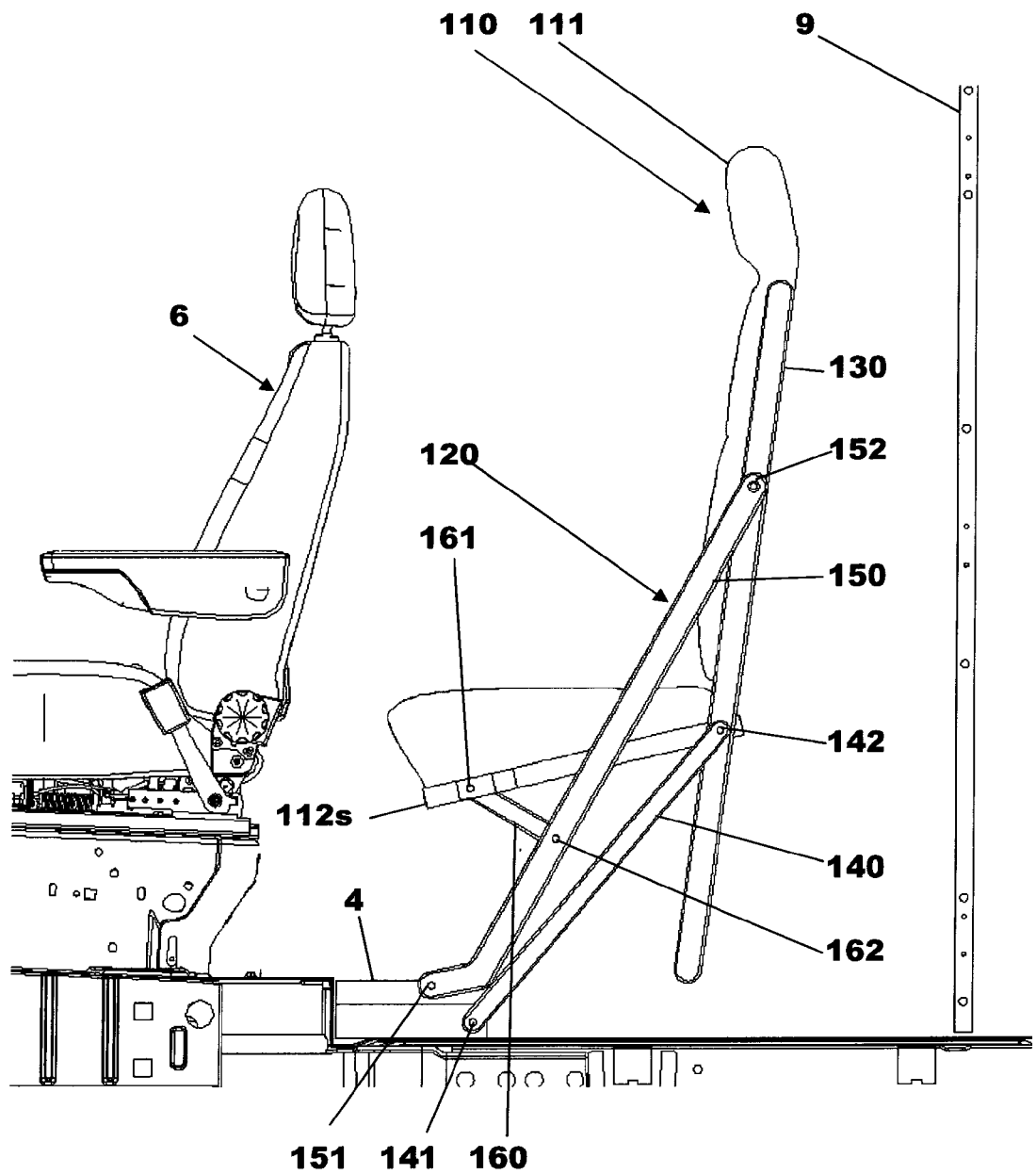
FIG. 10 is a schematic side view of the interior of the motor vehicle showing the second row seat shown in FIG. 8 and FIG. 9 in a partially stowed position.

In FIG. 10, the seat 110 is shown in a partially stowed position in which the latch used to hold the seat 110 in the in-use position has been released and the backrest 111 has been moved in a forward direction. This movement has not only caused the backrest 111 to move forwards but also to move upwards and to rotate forwards due to the constraint imposed by the second and third arms 140 and 150. The forward motion of the backrest 111 also causes the seat base 112 to rotate downwardly due to the connection of the fourth arm 160 to the third arm 150.

Figure 11:
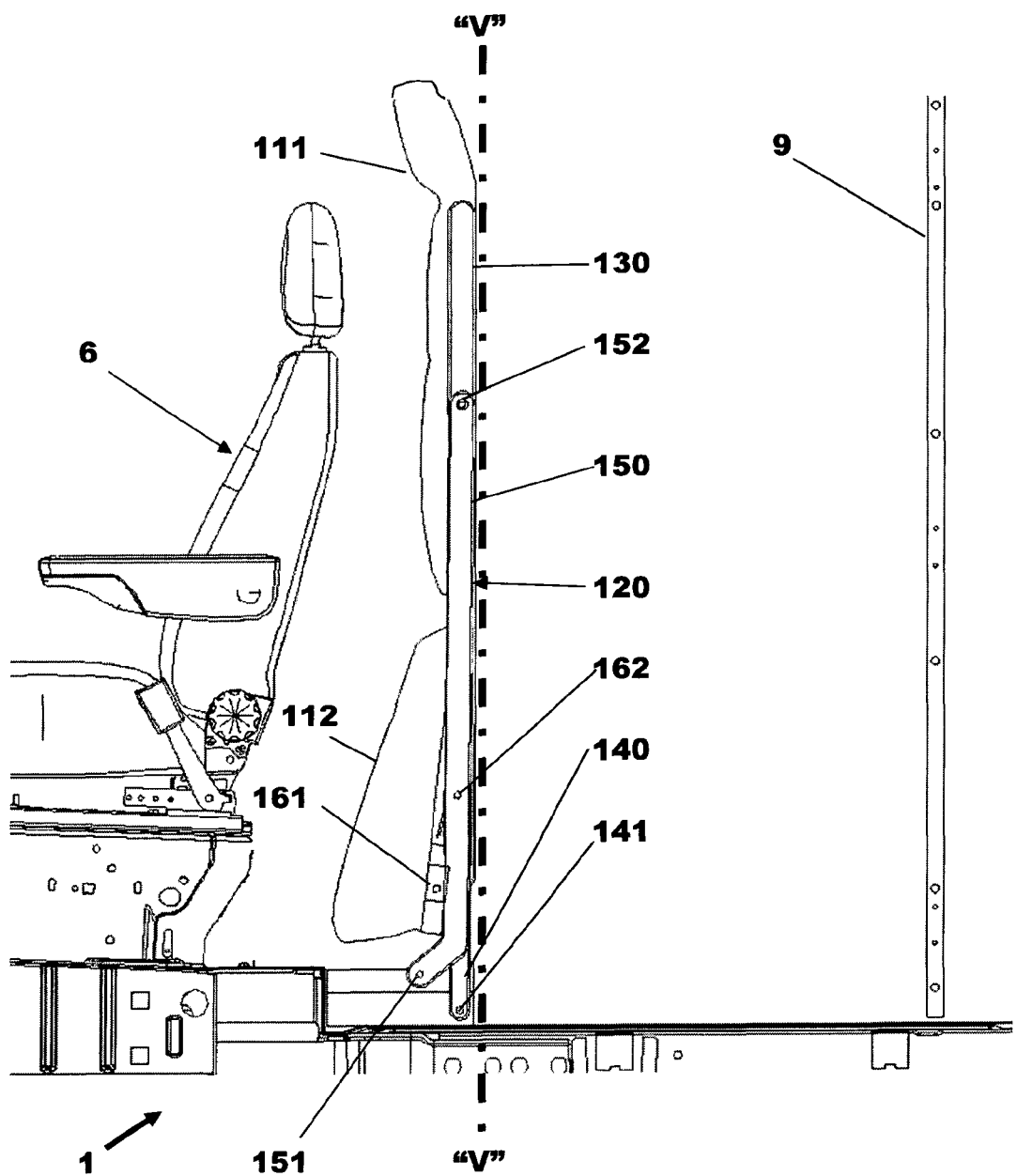
FIG. 11 is a schematic side view of the interior of the motor vehicle showing the second row seat of FIG. 8, FIG. 9 and FIG. 10 in a stowed position with a bulkhead in a rear position.
Figure 12:
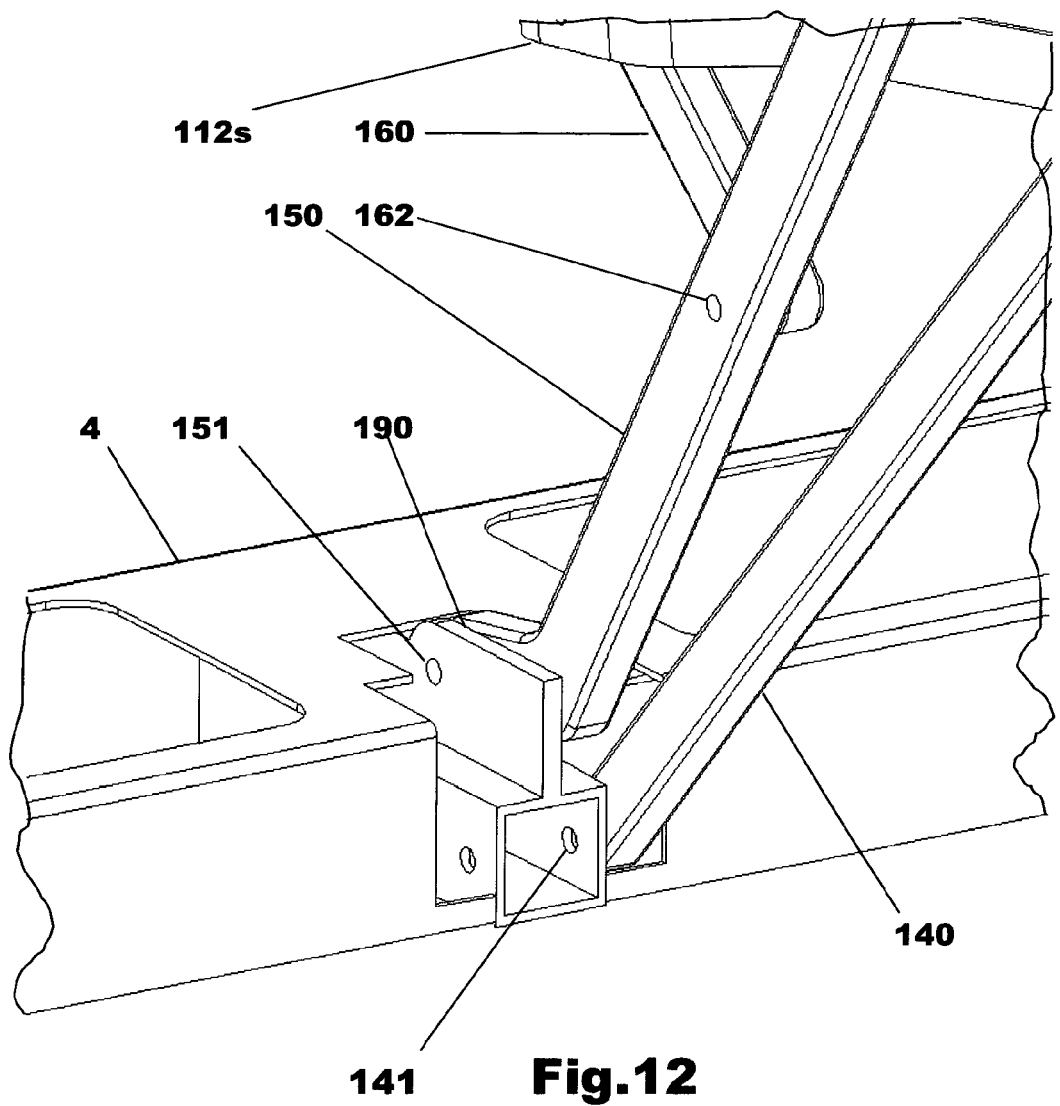
FIG. 12 is a pictorial view on an enlarged scale of a mounting for the seat shown in FIG. 8, FIG. 9, FIG. 10 and FIG. 11.

FIG. 11 shows the seat 110 in the stowed position prior to the bulkhead 9 being moved forward. In the stowed position the seat base 112 and the backrest 111 are arranged substantially vertically one upon the other with the backrest 111 extending substantially vertically upwards from the rear end of the stowed base 112.

When the seat 110 is in its stowed position, no part of the pair of support mechanisms 120 lies to the rear of a vertical plane "V" positioned adjacent to a rear face of the stowed backrest 111. The vertical plane "V" may be positioned so as to touch the rear face of the backrest 111 or may be positioned a few millimetres to the rear of the rear face of the backrest 111.

The front floor fixings of the pair of support mechanisms 120 are formed by the pivotal connections 141, 151 which are fastened to the floor of the vehicle by the bracket 190.

The front floor fixings in the form of the pivotal connections 141, 151 of the pair of support mechanisms 120 lie forwards of the vertical plane "V" so that the seat 110 can be transformed from its 'in-use' position to its stowed position by motion about its front floor fixings 141, 151. The front floor fixings 141, 151 never lie in the cargo area of the vehicle. When the seat 110 is in its stowed position, no part of the pair of support mechanisms 120 including the front floor fixings 141, 151 lies to the rear of the vertical plane "V" positioned adjacent to a rear face of the stowed backrest 111.

When the bulkhead 9 is in its forward position, a front face of the moveable bulkhead 9 is aligned with the vertical plane "V" and so it may be desirable for the vertical plane "V" to be slightly to the rear of the rear face of the backrest 111 so that rattling of the backrest 111 against the bulkhead 9 is avoided.

Operation of the seat 110 is as follows.

From the 'in-use' position as shown in FIGS. 8 and 9 the first step is to release the latches holding the seat 110 in the 'in-use' position, this is affected by operating a handle or lever (not shown) attached to an upper portion of the backrest 111 which is connected to the latches by a linkage such as cable (not shown). After the latches have been released the backrest 111 is merely pulled forward using the handle to the stowed position. Because the support mechanisms 120 interlink the backrest 111 and the seat base 112 no separate operation of the seat base 112 is required. After the seat 110 has been stowed the bulkhead 9 can be moved to its forward position.

To return the seat 110 from the stowed position to the 'in-use' position, the bulkhead 9 is first moved to its rear position and then the backrest 111 is merely pushed or pulled rearwardly until the latches are re-engaged.

One significant advantage of the invention is that movement of the seat 110 between the in-use and stowed positions is affected by simply moving the backrest 111 forward or rearward between its 'in-use' and stowed positions.

It will be appreciated that the seat 110 can be designed to have the capacity to accommodate a single passenger or could be designed to have the capacity to accommodate more than one passenger. It will also be appreciated that the motor vehicle may have two or more seats 110 arranged as a second row of seats.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A seat system for a vehicle, the vehicle having a floor, the seat system comprising:
   a bulkhead having a front, said bulkhead being movable forward;

a seat movable between in-use and stowed positions, the seat including:
  a base and a back having a rear; and
  a pair of support mechanisms interlinking said back and said base such that movement between positions is affected by moving said back forward or rearward, characterised in that when the seat is stowed, no part of the mechanisms lies to the rear of a vertical plane positioned adjacent said rear of said back when stowed and said bulkhead front is aligned with said plane when forward, said pair of supporting mechanisms comprising a second arm having one end pivotably attached to said back and another end pivotably attached to the floor of the vehicle and a third arm being forward of the second arm and having one end pivotably attached to said back and another end pivotably attached to the floor of the vehicle, the third arm further including a fourth arm extending therefrom, said fourth arm being pivotably attached to the seat base.

2. The system of claim 1 wherein said pivotable floor attachments of said second and third arms are positioned forward of said vertical plane so that said seat can be transformed from its in-use position to its stowed position by motion about said pivotable floor attachments.

3. The system of claim 1 further including a first arm fixed at one end to said seat back, said first arm being releasably attached at an opposite end to the floor of the vehicle by a latch and pivotally connected to said seat base so as to support the rear of said seat base, said second and third arms forming in combination with said seat back and the floor of the vehicle a four bar linkage.

4. The system of claim 3 wherein said seat base has a rear end and wherein said seat base, said fourth arm, the portion of said third arm between said pivotal connection to said fourth arm and said pivotal connection to said first arm and the portion of said first arm between said pivotal connection of said third arm to said first arm and said pivotal connection to said rear end of said seat base form a second four bar linkage which controls movement of said seat base in relation to said seat back during the transformation of said seat.

5. The system of claim 3 wherein said seat back includes a support frame and wherein said second and third arms are pivotally connected to said support frame and said first arm is fixed to said support frame.

6. The system of claim 1 further including at least two motor vehicle seats arranged as a second row of seats.

7. The system of claim 1 further including a second seat row selected from the group consisting of a one-passenger single seat, a two-passenger double seat, a multi-passenger bench seat, and any combination of said single seat, said double seat and said bench seat.

8. A collapsible seat for a vehicle, the vehicle having a floor, the collapsible seat comprising:
  a seat base;
  a seat back connected to said seat base;
  a first arm connected to said seat base, said first arm having upper and lower portions, said upper portion of said first arm being pivotably attached to said seat base;
  a second arm having an end pivotably attached to said seat back and an end pivotably attached to the floor; and
  a third arm having an end pivotably attached to said seat back and an end pivotably attached to the floor, said third arm further having a fourth arm extending therefrom, said fourth arm connecting to said seat base.

9. A seat for a vehicle having a floor and a bulkhead, the bulkhead having a front face and being movable forward, the seat comprising a seat back having a front end and a rear end and a seat base having front end and a rear end and a pair of support mechanisms connecting said seat back and said seat base to the vehicle floor, the seat being moveable from a deployed position in which said seat base is arranged substantially horizontally and said seat back extends upwardly from said rear end of said seat base to a stowed position in which said seat base and said seat back are arranged substantially vertically one upon the other with said seat back extending substantially vertically upwards from said rear end of said seat base when stowed, said pair of support mechanisms interlinking said seat back and said seat base such that movement between said deployed and stowed positions of the seat is affected by moving said seat back forward or rearward between its deployed and stowed positions, characterised in that when the seat is in said stowed position, no part of said pair of support mechanisms lies to the rear of a vertical plane positioned adjacent to said rear end of said seat back when stowed and, when the bulkhead is moved forward, said front face of said moveable bulkhead is aligned with the vertical plane, said pair of supporting mechanisms comprising a second arm having one end pivotably attached to said back and another end pivotably attached to the floor of the vehicle and a third arm being forward of the second arm and having one end pivotably attached to said back and another end pivotably attached to the floor of the vehicle, the third arm further including a fourth arm extending therefrom, said fourth arm being pivotably attached to the seat base.

10. A motor vehicle seat as claimed in claim 9 wherein said pivotable floor attachments of said second and third arms are positioned forward of said vertical plane so that said seat can be transformed from its in-use position to its stowed position by motion about said pivotable floor attachments.

11. A motor vehicle seat as claimed in claim 9 wherein there is one support mechanism located on each side of said seat, each of which comprises a first arm fixed at one end to said seat back releasably attached at an opposite end to the floor of the vehicle by a latch and pivotally connected to said seat base so as to support said rear end of said seat base, said second and third arms forming in combination with said seat back and the floor of the vehicle a four bar linkage.

12. A motor vehicle seat as claimed in claim 11 wherein said seat base, said fourth arm, the portion of said third arm between said pivotal connection to said fourth arm and said pivotal connection to said first arm and the portion of said first arm between said pivotal connection of said third arm to said first arm and said pivotal connection to said rear end of said seat base form a second four bar linkage which controls movement of said seat base in relation to said seat back during the transformation of said seat.

13. A motor vehicle seat as claimed in claim 11 wherein said seat back includes a support frame and wherein said second and third arms are pivotally connected to said support frame of the said seat back and said first arm is fixed to said support frame.

14. A motor vehicle as claimed in claim 9 having two or more motor vehicle seats arranged as a second row of seats.

15. A motor vehicle as claimed in claim 9 having a second seat row selected from the group consisting of a one-passenger single seat, a two-passenger double seat, a multi-passenger bench seat, and any combination of said single seat, said double seat and said bench seat.

* * * * *